United States Patent
Wakamatsu et al.

(10) Patent No.: US 8,356,513 B2
(45) Date of Patent: Jan. 22, 2013

(54) ANOMALY DETECTION APPARATUS FOR AUTOMATIC TRANSMISSION

(75) Inventors: Taihei Wakamatsu, Toyota (JP); Yoshitaka Suzuki, Toyota (JP); Hiroatsu Endo, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 407 days.

(21) Appl. No.: 12/715,482

(22) Filed: Mar. 2, 2010

(65) Prior Publication Data

US 2010/0223986 A1   Sep. 9, 2010

(30) Foreign Application Priority Data

Mar. 5, 2009 (JP) ................... 2009-052268

(51) Int. Cl.
*G01M 13/02* (2006.01)
(52) U.S. Cl. ................... 73/115.02
(58) Field of Classification Search .............. 73/114.77, 73/115.01, 115.02, 115.03, 116.04
See application file for complete search history.

(56) References Cited

U.S. PATENT DOCUMENTS

| 7,426,854 B2* | 9/2008 | Endo et al. | 73/115.02 |
| 7,819,768 B2* | 10/2010 | Kinugasa et al. | 475/5 |
| 2006/0169036 A1* | 8/2006 | Eguchi et al. | 73/168 |
| 2007/0173373 A1* | 7/2007 | Kinugasa et al. | 477/3 |
| 2007/0179018 A1* | 8/2007 | Endo et al. | 477/125 |
| 2007/0186632 A1* | 8/2007 | Endo et al. | 73/118.1 |
| 2009/0038387 A1* | 2/2009 | Endo et al. | 73/118.01 |

FOREIGN PATENT DOCUMENTS

| JP | 2000-266176 | 9/2000 |
| JP | 2002-310282 | 10/2002 |
| JP | 2004-232732 | 8/2004 |
| JP | 2004-340273 | 12/2004 |
| JP | 2007-205439 | 8/2007 |

* cited by examiner

*Primary Examiner* — Eric S McCall
(74) *Attorney, Agent, or Firm* — Finnegan, Henderson, Farabow, Garrett & Dunner, LLP

(57) ABSTRACT

One embodiment of the present invention provides an anomaly detection apparatus for an automatic transmission, the automatic transmission including an electrically-operated oil pump that is rotationally driven by an electric motor, including: a solenoid that is capable of switching a line pressure of a hydraulic control circuit that controls the automatic transmission between a high pressure and a low pressure; and an oil pressure switch that is turned on or off in response to the line pressure, wherein, in response to an oil pressure command value, whether the oil pressure switch is turned on or off according to the oil pressure command value is determined, and the determination and a load state of the electrically-operated oil pump are compared so as to distinctively determine in which of the solenoid and the oil pressure switch, an anomaly has occurred.

4 Claims, 5 Drawing Sheets

FIG.4

| Oil Pressure Command | SW3 Output | Load State | Determination |
|---|---|---|---|
| Hi | Hi | Hi | Normal (S4) |
| Hi | Lo | Hi | Fault in SW (S7) |
| Hi | Lo | Lo | Fault in Solenoid (S8) |
| Hi | Hi | Lo | Double fault in Solenoid & SW (S5) |
| Lo | Hi | Hi | Fault in Solenoid (S8) |
| Lo | Lo | Hi | Double fault in Solenoid & SW (S5) |
| Lo | Lo | Lo | Normal (S4) |
| Lo | Hi | Lo | Fault in SW (S7) |

ANOMALY DETECTION APPARATUS FOR AUTOMATIC TRANSMISSION

BACKGROUND OF THE INVENTION

The present invention relates to an anomaly detection apparatus for an automatic transmission that has an electrically-operated oil pump that is rotationally driven by an electric motor.

This application claims priority under 35 U.S.C. §119(a) on Japanese Patent Application No. 2009-052268 filed in Japan on Mar. 5, 2009, the entire content of which is incorporated herein by reference.

Automatic transmissions are often employed in automobiles in order to eliminate the inconvenience of operating a clutch pedal, a gear stick, and an accelerator pedal when performing a shift operation.

In such automatic transmissions as typified by an EAT (electronic control automatic transmission), usually, automatic shift control is performed by a microcomputer according to accelerator opening degree and vehicle speed.

Specifically, an automatic transmission that performs such automatic shift control is configured with a plurality of gear trains that constitute power transmission paths, and shift control is performed by automatically selecting and switching to any one of the power transmission paths by engagement control of frictionally engaging elements (a hydraulic clutch, a break, etc.).

It is known that the engagement control of frictionally engaging elements is performed by controlling supply of working oil pressure, but the supply of working oil pressure is often electrically controlled by a solenoid.

Accordingly, an anomaly in the solenoid can lead to a shift control failure, so it is important to detect such an anomaly. In view of this, an anomaly detection apparatus for an automatic transmission that detects an anomaly in the solenoid has been disclosed (see, for example, JP2002-310282A).

In such an anomaly detection apparatus for an automatic transmission, the pressure of working oil that is pumped from an oil pressure pump that is rotationally driven by the engine is regulated by a pressure regulation valve according to pressure command signals, and used as source pressure. Recently, however, an anomaly detection apparatus for an automatic transmission, as typically used in, for example, a hybrid vehicle and the like, has also been developed that controls working oil by pumping the working oil from an electrically-operated oil pump that is rotationally driven by a dedicated electric motor that is provided separately from an engine (see, for example, JP 2007-205439A).

FIG. 5 is a flowchart of processing performed by a conventional anomaly detection apparatus for an automatic transmission.

This conventional anomaly detection apparatus for an automatic transmission makes judgments, for example, based on an oil pressure switch and oil pressure command values supplied from an electronic control unit (T-ECU) to a solenoid.

That is, when an oil pressure command represents a command to open the solenoid, the oil pressure command is a high line pressure command, and when an oil pressure command represents a command to close the solenoid, the oil pressure command is a low line pressure command.

The solenoid is operated in response to such an oil pressure command, and the oil pressure switch is turned on or off in response to the line pressure of the solenoid (low pressure or high pressure).

Accordingly, in the conventional anomaly detection apparatus for an automatic transmission, whether or not the oil pressure switch is being operated according to the oil pressure command is determined (S100, S101). If the oil pressure switch is being operated according to the oil pressure command, it is determined that normal operation is being carried out (S102). If the oil pressure switch is not being operated according to the oil pressure command, it is determined that an anomaly has occurred (S103).

However, even when it has been determined that normal operation is being carried out, if both the oil pressure switch and the solenoid are broken down (hereinafter also referred to as a "double fault"), the anomaly detection apparatus for an automatic transmission may not detect such an anomaly.

For example, in the case of the oil pressure command being a "high pressure command", if the solenoid closes due to a fault thereof (it would be open in normal operation), and the oil pressure switch is turned on (it would be turned off in normal operation) due to a fault thereof in response to a line pressure (low pressure) from the closed solenoid (or in other words, if a double fault occurs), the conventional anomaly detection apparatus would determine that normal operation is being carried out because the oil pressure switch is "turned on" according to the oil pressure command, that is, "high pressure command", as a result of which the anomaly may not be detected.

The above anomaly detection apparatus for an automatic transmission also has a problem in that it cannot distinctively determine which of the oil pressure switch and the solenoid is broken down if an anomaly is determined to have occurred.

For example, in the case where the oil pressure switch is not operated according to the oil pressure command and thus an anomaly is determined to have occurred, it is possible to determine that a fault has occurred in either the oil pressure switch or the solenoid.

However, with only such an anomaly determination, it is not possible to distinctively determine which of the oil pressure switch and the solenoid is broken down.

For this reason, for example, in the case where an anomaly is determined to have occurred, if only the solenoid is broken down, despite the fact that only the solenoid is broken down, the oil pressure switch is exchanged together with the solenoid, wasting the cost of the oil pressure switch.

It is an object of the present invention to solve the above problems, and to provide an anomaly detection apparatus for an automatic transmission, wherein the automatic transmission has an electrically-operated oil pump and the anomaly detection apparatus is capable of not only determining a double fault, but also distinctively determining in which of a solenoid and an oil pressure switch, an anomaly has occurred.

SUMMARY OF THE INVENTION

In order to solve the above problems, an anomaly detection apparatus for an automatic transmission according to the present invention is an anomaly detection apparatus for an automatic transmission, the automatic transmission including an electrically-operated oil pump that is rotationally driven by an electric motor, including: a solenoid that is capable of switching a line pressure of a hydraulic control circuit that controls the automatic transmission between a high pressure and a low pressure; and an oil pressure switch that is turned on or off in response to the line pressure, wherein, in response to an oil pressure command value, whether the oil pressure switch is turned on or off according to the oil pressure command value is determined, and the determination and a load state of the electrically-operated oil pump are compared so as to distinctively determine in which of the solenoid and the oil pressure switch, an anomaly has occurred.

According to the anomaly detection apparatus for an automatic transmission of the present invention, it is possible to not only determine a double fault, but also to distinctively determine in which of the solenoid and the oil pressure switch, an anomaly has occurred.

BRIEF DESCRIPTION OF THE DRAWINGS

FIG. 4 is a decision table showing the results of FIG. 3.

DESCRIPTION OF REFERENCE NUMERALS

22 Automatic Transmission
48 Electrically-Operated Oil Pump
48a Electric Motor
50 Hydraulic Control Circuit
64 Solenoid (Electromagnetic Open/Close Valve)
SW3 Oil Pressure Switch
PL Line Pressure

DESCRIPTION OF THE PREFERRED EMBODIMENTS

Hereinafter, an embodiment of the present invention will be described with reference to the drawings.

Figure 1:
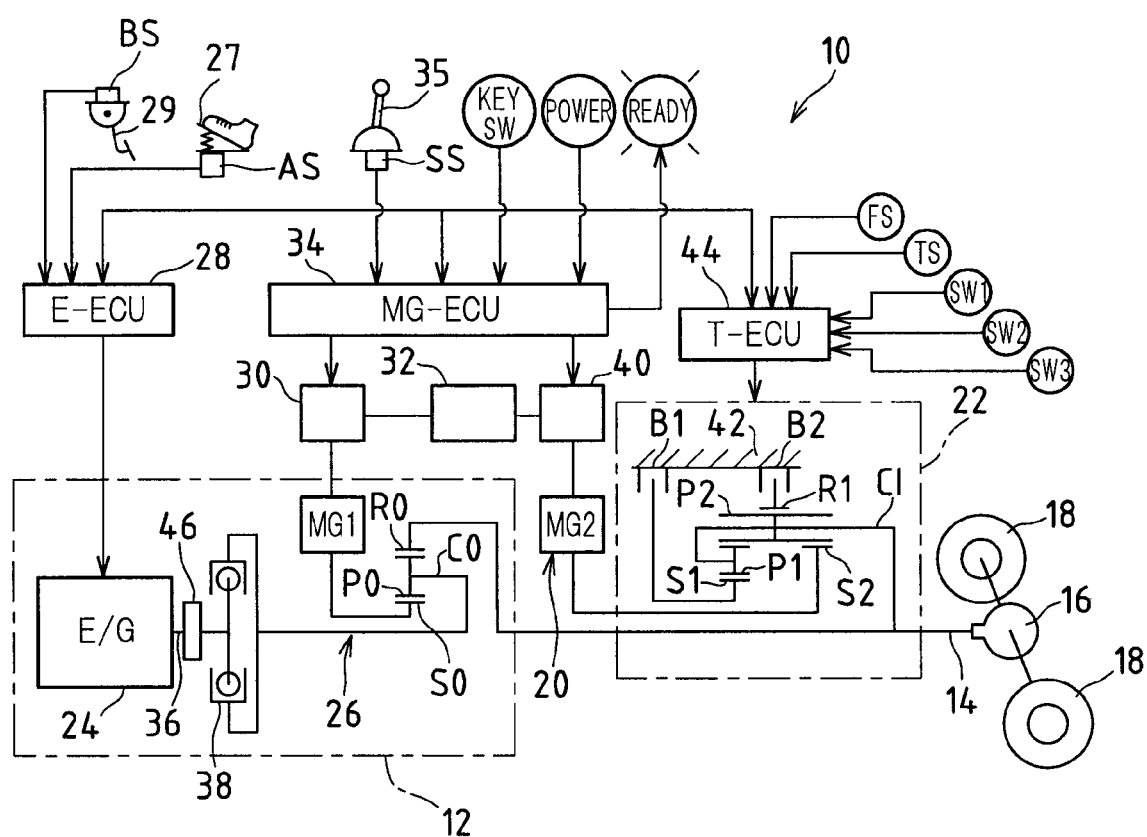
FIG. 1 is a block diagram used to illustrate a drive apparatus and a control apparatus of a hybrid vehicle according to an embodiment of the present invention.

FIG. 1 is a block diagram used to illustrate a drive apparatus and a control apparatus of a hybrid vehicle 10 of the present embodiment.

As shown in FIG. 1, the hybrid vehicle 10 is configured such that torque of a first driving power source 12 that is a primary driving power source is transmitted to an output shaft 14 that functions as an output member, and the torque is transmitted from the output shaft 14 to a pair of right and left driving wheels 18 that serve as front or rear wheels via a differential gear apparatus 16.

The hybrid vehicle 10 also includes a second driving power source 20 that is capable of executing power running control for outputting driving power for running or regenerative control for recovering energy. The second driving power source 20 is connected to the output shaft 14 via an automatic transmission 22.

Accordingly, torque capacity transmitted from the second driving power source 20 to the output shaft 14 is increased or decreased according to a gear ratio γs (=rotational speed of MG2/rotational speed of output shaft 14) set by the automatic transmission 22.

In the automatic transmission 22, the gear ratio γs is set so as to establish a plurality of gear steps whose gear ratios γs are greater than or equal to "1", so the torque can be increased and transmitted to the output shaft 14 during power running when the torque is output from the second driving power source 20, as a result of which the second driving power source 20 is configured to be further reduced in capacity or size.

With this configuration, in the case where, for example, the rotational speed of the output shaft 14 is increased as the vehicle speed is increased, in order to maintain good operational efficiency of the second driving power source 20, the gear ratio γs is lowered so as to reduce the rotational speed of the second driving power source 20. Conversely, in the case where the rotational speed of the output shaft 14 is decreased, the gear ratio γs is increased.

During gear shift of the automatic transmission 22, the torque capacity in the automatic transmission 22 may be reduced, or inertia torque that occurs due to changes in the rotational speed may be generated, which can affect the torque of the output shaft 14, that is, output shaft torque.

Accordingly, in the hybrid vehicle 10, control is performed such that the torque of the first driving power source 12 is corrected during gear shift of the automatic transmission 22 so as to prevent or suppress the torque fluctuation in the output shaft 14.

The first driving power source 12 is primarily configured with an engine 24, a first motor generator (hereinafter referred to as "MG1"), and a planetary gear apparatus 26 that functions as a power distribution mechanism for synthesizing or distributing torque between the engine 24 and the MG1.

The engine 24 is a well-known internal combustion engine that outputs power by burning fuel, such as a gasoline engine or a diesel engine, and is configured such that operational conditions, such as a throttle opening degree or the amount of intake air, the amount of supplied fuel, an ignition timing, etc., are electrically controlled by an electronic control unit (E-ECU) 28 for engine control that is primarily configured with a microcomputer.

Detection signals are supplied to the electronic control apparatus 28 from an accelerator opening degree sensor AS for detecting the amount of operation of an accelerator pedal 27, a brake sensor BS for detecting an operation of a brake pedal 29, and the like.

The MG1 can be, for example, a synchronous electric motor, which is configured to selectively perform an electric motor function for generating driving torque and a power generating function. The MG1 is connected to a power storage apparatus 32 such as a battery or capacitor via an inverter 30.

The inverter 30 is controlled by an electronic control unit (MG-ECU) 34 for controlling motor generators that is primarily configured with a microcomputer, as a result of which the output torque or regenerative torque of the MG1 is adjusted or set.

Detection signals are supplied to the electronic control apparatus 34 from an operational position sensor SS for detecting an operational position of a shift lever 35, a key switch KEY SW for detecting insertion of a key for a start operation, a start operation button POWER for detecting a command operation for the start operation, and the like. In response to the start operation, the electronic control apparatus 34 is configured so as to illuminate a running indicator READY that indicates that the vehicle is ready to run.

The planetary gear apparatus 26 is a single pinion type planetary gear mechanism that includes three rotating elements, namely, a sun gear S0, a ring gear R0 that is disposed concentrically with the sun gear S0, and a carrier C0 that supports a pinion gear P0 that is engaged with the sun gear S0 and the ring gear R0 so as to be capable of rotation and revolution, and that produces well-known differential effects.

The planetary gear apparatus 26 is provided concentrically with the engine 24 and the automatic transmission 22.

Because the planetary gear apparatus 26 and the automatic transmission 22 are configured symmetrically about a center line, the lower halves thereof are omitted in FIG. 1.

In the present embodiment, a crank shaft 36 of the engine 24 is connected to the carrier C0 of the planetary gear apparatus 26 via a damper 38.

In addition, the MG1 is connected to the sun gear S0, and the output shaft 14 is connected to the ring gear R0.

The carrier C0 functions as an input element, the sun gear S0 functions as a reaction force element, and the ring gear R0 functions as an output element.

The automatic transmission 22 of the present embodiment is configured with a ravigneaux type planetary gear set mechanism.

That is, the automatic transmission 22 includes a first sun gear S1 and a second sun gear S2. The first sun gear S1 is engaged with a short pinion P1, the short pinion P1 is engaged with a long pinion P2 that has a longer shaft than that of the short pinion P1, and the long pinion P2 is engaged with a ring gear R1 that is disposed concentrically with the sun gears S1 and S2.

Each of the pinions P1 and P2 is held by a common carrier C1 so as to be capable of rotation and revolution.

The second sun gear S2 is also engaged with the long pinion P2.

The second driving power source 20 is configured with a second motor generator (hereinafter referred to as "MG2") that serves as an electric motor or power generator, and by being controlled by the electronic control unit (MG-ECU) 34 for controlling motor generators via an inverter 40, assist output torque or regenerative torque is adjusted or set in the MG2.

The MG2 is connected to the second sun gear S2, and the carrier C1 is connected to the output shaft 14.

The first sun gear S1 and the ring gear R1, together with the respective pinions P1 and P2, constitute a mechanism that corresponds to a double pinion type planetary gear apparatus. Likewise, the second sun gear S2 and the ring gear R1, together with the long pinion P2, constitute a mechanism that corresponds to a single pinion type planetary gear apparatus.

The automatic transmission 22 also includes a first brake B1 that is provided between the first sun gear S1 and a transmission housing 42 in order to selectively fix the first sun gear S1 and a second brake B2 that is provided between the ring gear R1 and the transmission housing 42 in order to selectively fix the ring gear R1.

These brakes B1 and B2 are what are called frictionally engaging apparatuses that generate braking force by frictional force, and can be multi-plate type engaging apparatuses or band type engaging apparatuses.

The brakes B1 and B2 are configured such that the torque capacity is successively changed according to an engagement pressure that is generated by a hydraulic actuator or the like.

In the thus-configured automatic transmission 22, the second sun gear S2 functions as an input element and the carrier C1 functions as an output element. When the first brake B1 is engaged, a high gear step H with a gear ratio γsh that is greater than "1" is established. When the second brake B2 is engaged instead of the first brake B1, a low gear step L with a gear ratio γsl that is greater than the gear ratio γsh of the high gear step H is established.

The gear shift between the gear steps H and L is executed based on running conditions such as the vehicle speed, the required drive power (or accelerator opening degree), and so on.

More specifically, gear step regions are determined in advance as a map (shift chart), and control is performed such that any one of the gear steps is set according to the detected vehicle driving condition.

A transmission electronic control unit (T-ECU) 44 that is primarily configured with a microcomputer for performing such control is provided.

Detection signals are supplied to the electronic control apparatus 44 from an oil temperature sensor TS for detecting the temperature of working oil, an oil pressure switch SW1 for detecting an engagement oil pressure of the first brake B1, an oil pressure switch SW2 for detecting an engagement oil pressure of the second brake B2, an oil pressure switch SW3 for detecting a line pressure PL, and the like.

In the thus-configured automatic transmission 22, when the ring gear R1 is fixed by the second brake B2, the low gear step L is set, and the assist torque output from the MG2 is amplified according to the gear ratio γsl at that time, and applied to the output shaft 14.

Conversely, when the first sun gear S1 is fixed by the first brake B1, the high gear step H with a gear ratio γsh that is smaller than the gear ratio γsl of the low gear step L is set.

Because the gear ratio of the high gear step H is also larger than "1", the assist torque output from the MG2 is increased according to the gear ratio γsh at that time, and applied to the output shaft 14.

In a state in which one of the gear steps L and H is steadily set, torque obtained by increasing the output torque of the MG2 according to the corresponding gear ratio is applied to the output shaft 14, whereas in a gear shift transition state of the automatic transmission 22, torque affected by the torque capacity of the brake B1 or B2, the inertia torque generated due to changes in the rotational speed, and the like is applied to the output shaft 14.

In addition, the torque applied to the output shaft 14 in a driving state of the MG2 is a positive torque, and the torque applied to the output shaft 14 in a driven state of the MG2 is a negative torque.

Figure 2:
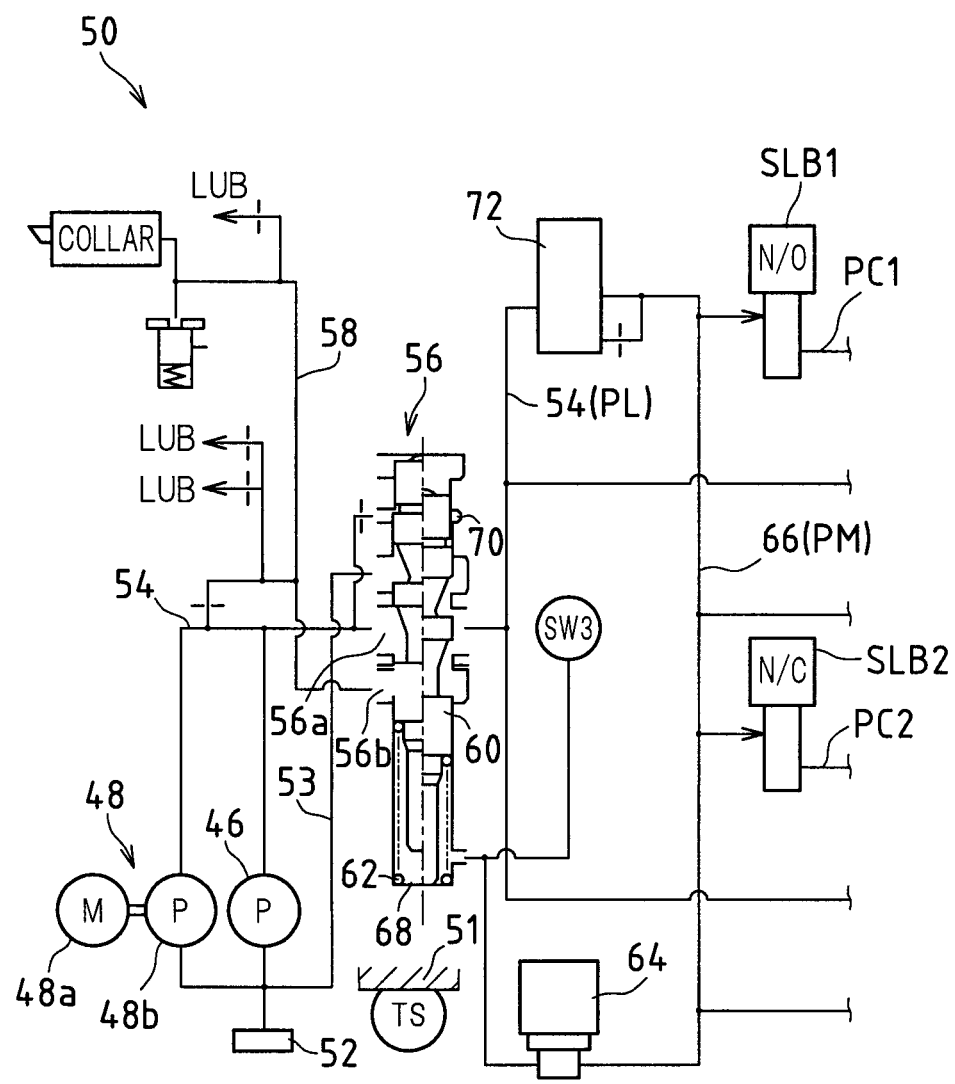
FIG. 2 is a block diagram used to illustrate a relevant part of a hydraulic control circuit for controlling an automatic transmission according to the embodiment of the present invention.

FIG. 2 is a block diagram used to illustrate a relevant part of a hydraulic control circuit 50 for automatically controlling the gear shift of the automatic transmission 22 by engaging and disengaging each of the brakes B1 and B2.

The hydraulic control circuit 50 includes, as oil pressure sources, a mechanical type oil pressure pump 46 that is rotationally driven by the engine 24 by being operatively connected to the crank shaft 36 of the engine 24 and an electrically-operated oil pump 48 that includes a pump 48b that is rotationally driven by an electric motor 48a. The mechanical type oil pressure pump 46 and the electrically-operated type oil pressure pump 48 draw working oil that has flowed back to an oil pan (not shown), via a strainer 52, or draw working oil that has flowed back directly thereto via a flow-back oil path 53, and pump the working oil to a line pressure oil path 54.

An oil temperature sensor TS for detecting working oil temperature TOIL of the flow-back working oil is provided to a valve body 51 that forms the hydraulic control circuit 50. The oil temperature sensor TS may be connected to another part.

A line pressure regulation valve 56 is a relief-type pressure regulation valve, and includes a spool valve element 60 that opens and closes between a supply port 56a that is connected to the line pressure oil path 54 and a discharge port 56b that is connected to a drain oil path 58, a control oil chamber 68 that houses a spring 62 for generating thrust in the closing direction of the spool valve element 60 and that receives a module pressure PM from a module pressure oil path 66 via an electromagnetic open/close valve 64 when the set line pressure PL is changed to a higher level, and a feedback oil chamber 70 connected to the line pressure oil path 54 that generates thrust in the opening direction of the spool valve element 60. The line pressure regulation valve 56 outputs one of two constant line pressures PL, which are a low value and a high value higher than the low value that are preset.

The oil pressure switch SW3 is connected to the control oil chamber 68. The oil pressure switch SW3 is turned off when the module pressure PM is not supplied to the control oil chamber 68, and is turned on when the module pressure PM is supplied to the control oil chamber 68.

The line pressure regulation valve 56 regulates the line pressure PL so as to be a low pressure side value when the module pressure PM is not supplied to the control oil chamber 68, and regulates the line pressure PL so as to be a high pressure side value when the module pressure PM is supplied to the control oil chamber 68. Accordingly, the oil pressure switch SW3 is turned on when the line pressure PL of the line pressure oil path 54 is a high pressure side value, and is turned off when the line pressure PL is a low pressure side value.

Disposing the oil pressure switch SW3 as described above avoids what is called a hunting phenomenon, in which the oil pressure switch SW3 is repeatedly turned on and off even when the line pressure PL is a low pressure side value, that is caused by rising of the line pressure PL above a set regulation value or a pulse of the working oil pressure pumped from the mechanical type oil pressure pump 46 or the electrically-operated oil pump 48 as compared to the case where the oil pressure switch SW3 is connected to the line pressure oil path 54.

A module pressure regulation valve 72 outputs, to the module pressure oil path 66, a constant module pressure PM that is set lower than a low pressure-side line pressure PL by using the line pressure PL of the line pressure oil path 54 as source pressure, regardless of fluctuations of the line pressure PL.

The thus-configured anomaly detection apparatus of the present embodiment is controlled by, for example, the electronic control apparatus 44 in the following manner.

Figure 3:
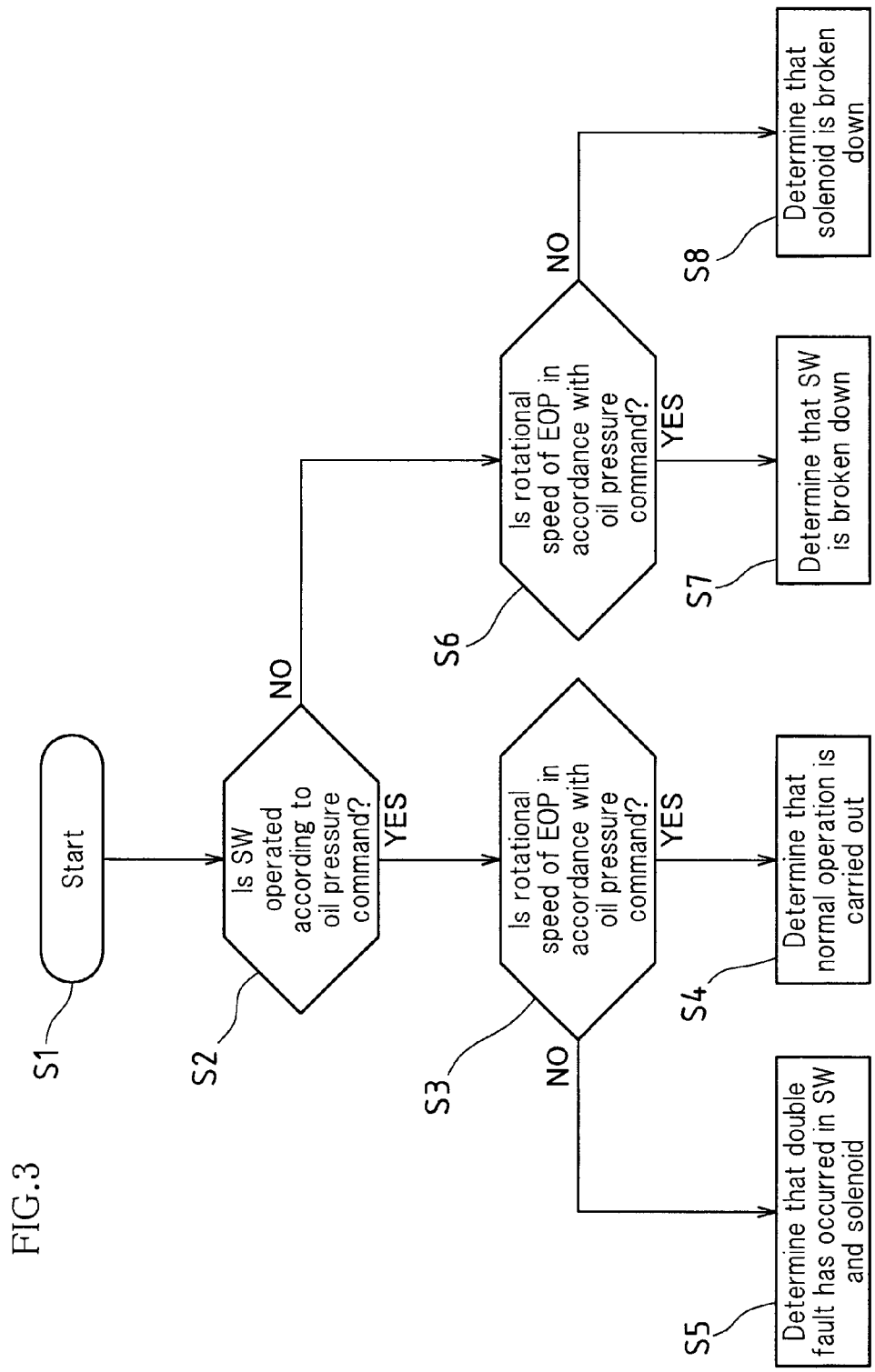
FIG. 3 is a flowchart of processing performed by an anomaly detection apparatus for an automatic transmission according to the embodiment of the present invention.
Figure 5:
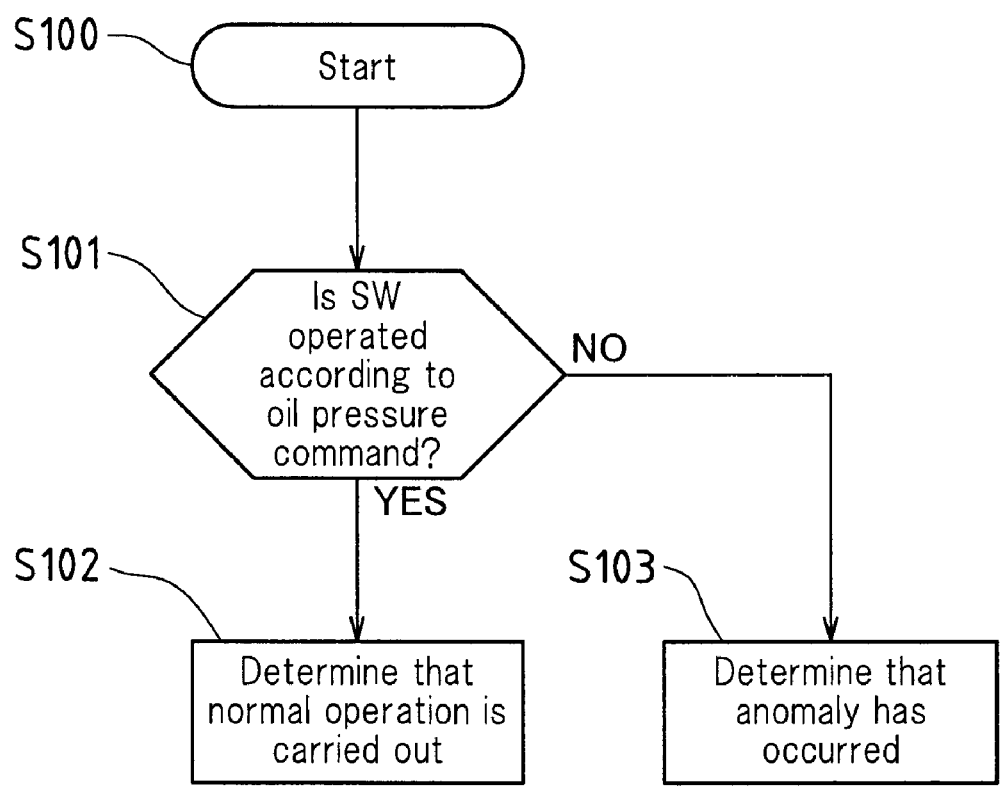
FIG. 5 is a flowchart of processing performed by a conventional anomaly detection apparatus for an automatic transmission.

FIG. 3 is a flowchart of processing performed by the anomaly detection apparatus for an automatic transmission of the present embodiment, and FIG. 4 is a decision table that shows the results of FIG. 3.

In the anomaly detection apparatus for an automatic transmission of the present embodiment, first, a judgment is made based on an oil pressure command value supplied from the electronic control apparatus 44 to the electromagnetic open/close valve (solenoid) 64 and the oil pressure switch SW3, or in other words, in response to the oil pressure command value, whether the oil pressure switch SW3 is turned on or off according to the oil pressure command value is determined (S1, S2).

Next, the determination made in S2 and a load state of the electrically-operated oil pump 48 are compared, and a judgment is made (S3).

The load state of the electrically-operated oil pump 48 can be easily determined by detecting any one of the rotational speed, the current, the rotation command value and the like of the electrically-operated oil pump 48. In the present embodiment, an example is shown in which the load state is determined by using the rotational speed of the electrically-operated oil pump 48.

For example, in the case where the oil pressure command is a "high pressure command (Hi)" and the oil pressure switch SW3 is properly turned on (Hi), such a determination and the load state of the electrically-operated oil pump 48 are compared.

Then, if the load state is a high pressure (Hi) state, a "normal operation" is determined (S4).

If, on the other hand, the load state is a low pressure (Lo) state, a "double fault" is determined (S5).

In addition, in the case where the oil pressure command is the "high pressure command (Hi)" and the oil pressure switch SW3 is turned off (Lo) as an anomaly, such a determination and the load state of the electrically-operated oil pump 48 are compared (S6).

Then, if the load state is the high pressure (Hi) state, it is determined that "an anomaly has occurred in the oil pressure switch SW3" (S7).

If, on the other hand, the load state is the low pressure (Lo) state, it is determined that "an anomaly has occurred in the solenoid" (S8).

With the anomaly detection apparatus for an automatic transmission of the present embodiment controlled in the above-described manner, in the automatic transmission 22 that includes the electrically-operated oil pump 48, it is possible to not only determine a double fault, but also to distinctively determine in which of the solenoid 64 and the oil pressure switch SW3, an anomaly has occurred with ease and reliability.

The present invention may be embodied in various other forms without departing from the gist or essential characteristics thereof. Therefore, the embodiment described above is to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An anomaly detection apparatus for an automatic transmission, the automatic transmission including an electrically-operated oil pump that is rotationally driven by an electric motor, comprising:
   a solenoid configured to switch a line pressure of a hydraulic control circuit that controls the automatic transmission between a high pressure and a low pressure; and
   an oil pressure switch that is turned on or off in response to the line pressure,
   wherein the apparatus is configured to determine, in response to an oil pressure command value supplied from an electronic control apparatus, whether the oil pressure switch is turned on or off according to the oil pressure command value, and
   the apparatus is configured to compare the determination and a load state of the electrically-operated oil pump so as to distinctively determine in which of the solenoid and the oil pressure switch, an anomaly has occurred.

2. The anomaly detection apparatus for an automatic transmission of claim 1, further comprising:
   a line pressure regulation valve including a control oil chamber,
   wherein the oil pressure switch is connected to the control oil chamber.

3. The anomaly detection apparatus for an automatic transmission according to claim 1,
   wherein in the case where the oil pressure command value is a high pressure command value and the oil pressure switch is properly turned on,
   if the load state of the electrically-operated oil pump is a high pressure state, a normal operation is determined;
   if the load state of the electrically-operated oil pump is a low pressure state, it is determined that both the solenoid and the oil pressure switch are broken down, and wherein in the case where the oil pressure command value is the high pressure command value and the oil pressure switch is turned off as an anomaly, if the load state of the electrically-operated oil pump is the high pressure state, it is determined that an anomaly has occurred in the oil pressure switch;

if the load state of the electrically-operated oil pump is the low pressure state, it is determined that an anomaly has occurred in the solenoid.

4. The anomaly detection apparatus for an automatic transmission according to claim 1, wherein in the case where the oil pressure command value is a low pressure command value and the oil pressure switch is properly turned off, if the load state of the electrically-operated oil pump is the low pressure state, the normal operation is determined;

if the load state of the electrically-operated oil pump is the high pressure state, it is determined that both the solenoid and the oil pressure switch are broken down, and wherein in the case where the oil pressure command value is the low pressure command value and the oil pressure switch is turned on as an anomaly, if the load state of the electrically-operated oil pump is the low pressure state, it is determined that an anomaly has occurred in the oil pressure switch;

if the load state of the electrically-operated oil pump is the high pressure state, it is determined that an anomaly has occurred in the solenoid.

* * * * *